United States Patent
Brunner et al.

(12)

(10) Patent No.: US 8,419,847 B2
(45) Date of Patent: Apr. 16, 2013

(54) UV OR EB CURING SCREEN PRINTING INKS CONTAINING A HIGH AMOUNT OF RENEWABLE/SUSTAINABLE MATERIAL

(75) Inventors: Alfred Brunner, Buckenhof (DE); Edwin Tafelmeier, Fürth (DE)

(73) Assignee: Sun Chemicals BV, Weesp (NL)

( * ) Notice: Subject to any disclaimer, the term of this patent is extended or adjusted under 35 U.S.C. 154(b) by 173 days.

(21) Appl. No.: 13/056,854

(22) PCT Filed: Jul. 7, 2009

(86) PCT No.: PCT/EP2009/059920
§ 371 (c)(1),
(2), (4) Date: Jan. 31, 2011

(87) PCT Pub. No.: WO2010/012818
PCT Pub. Date: Feb. 4, 2010

(65) Prior Publication Data
US 2011/0139022 A1    Jun. 16, 2011

Related U.S. Application Data

(60) Provisional application No. 61/085,495, filed on Aug. 1, 2008.

(51) Int. Cl.
*C09D 11/02* (2006.01)

(52) U.S. Cl.
USPC .............. 106/31.27; 106/31.6; 106/31.34; 106/31.66

(58) Field of Classification Search .......... 106/31.27, 106/31.6, 31.34, 31.66
See application file for complete search history.

(56) References Cited

U.S. PATENT DOCUMENTS

| | | | |
|---|---|---|---|
| 6,853,302 B2 * | 2/2005 | Monroe | 340/573.1 |
| 2004/0102543 A1 | 5/2004 | Sasa | |
| 2004/0259971 A1 | 12/2004 | Sasa | |
| 2005/0119362 A1 | 6/2005 | Ishikawa | |
| 2007/0110958 A1 * | 5/2007 | Meyers et al. | 428/141 |
| 2008/0105161 A1 * | 5/2008 | Asada et al. | 106/31.13 |
| 2009/0081465 A1 * | 3/2009 | Morgenstern et al. | 428/411.1 |

FOREIGN PATENT DOCUMENTS

EP    1772498 A2    4/2007

* cited by examiner

*Primary Examiner* — Kaj K Olsen
*Assistant Examiner* — Veronica F Faison
(74) *Attorney, Agent, or Firm* — McKenna Long & Aldridge LLP; Matthew Bailey

(57) ABSTRACT

UV or EB curing ink compositions for screen printing which contain a remarkably high amount of an epoxidized vegetable or animal oil as sustainable material and a reactive diluent.

14 Claims, No Drawings

UV OR EB CURING SCREEN PRINTING INKS CONTAINING A HIGH AMOUNT OF RENEWABLE/SUSTAINABLE MATERIAL

This application claims priority to PCT/EP2009/059920 filed on Jul. 31, 2009, and U.S. Provisional Application No. 61/085,495 filed Aug. 1, 2008, all of which are hereby incorporated by reference in their entirety.

The present invention relates to ink formulations, based on epoxidized vegetable oil or animal oil, which can be cured with UV-lamps or electron beams (EB) and which are suitable for industrial and commercial use.

Screen printing is widely used for printing on various kinds of substrates such as various kinds of papers, paper board, card board, textiles, leather, wood, glass, metal, and various plastic materials. Screen printing inks are characterized by a very high viscosity (compared for instance to gravure printing inks), i.e. they are usually paste-like.

With respect to the drying process of screen printing inks there are (1) physically drying inks which dry by evaporating solvents and other volatile components for instance in a continuous-flow dryer, and (2) chemically drying inks which dry by reactive or oxidative curing mechanisms. The chemically drying inks are usually inks where UV radiation or electron beams (EB) are used for initiating the curing.

UV or EB curing screen inks are typically made from materials, based on crude-oil chemistry. The binder systems of free radical curing systems are typically based on reactive acrylics, while the binder system of cationic curing systems are typically based on cycloaliphatic epoxides.

In our days it is, however, preferred to use renewable/sustainable materials also in printing inks.

It is known that epoxidized vegetable oils are suitable for cationic cure mechanism and are currently offered for wood coating applications. These systems, however, are not suitable for use as UV or EB curing inks in screen printing, because their reactivity is too low for typical curing conditions in screen printing apparatus. The screen printing industry typically uses doses from about 70 to 300 $mJ/cm^2$, which usually is too low to effectively cure a pigmented system based on epoxidized vegetable oil.

It was therefore the object of the present invention to provide a printing ink for screen printing which contains a high amount of sustainable material but is curable with the usual energy doses of common screen printing apparatus.

This object is achieved by a printing ink composition comprising
 (a) at least one epoxidized vegetable or epoxidized animal oil which is optionally further modified, and
 (b) at least one reactive diluent selected from optionally substituted oxetanes and limonene diepoxide,
wherein the amount of component (a) is 40 to 95 wt.-% based on the total ink composition, and the ink is characterized as suitable for screen printing.

The inks of the present invention are based on epoxidized vegetable or animal oils in combination with oxetanes or limonene diepoxide for screen ink applications and working conditions, that meet the requirements for their industrial use.

Trials have shown that this system works well under industrial conditions. Adhesion after 24 h is very good for commercial use and typically checked by tape & crosshatch tests. There is a wide field of materials to print on with the inks of the present invention, such as, but not limited to: paper and board: plastics materials like PP, PE, PVC, PC; glass; metal; etc.

One of the essential features of the inks of the present invention is the high amount of sustainable material, an epoxidized vegetable oil or animal oil which is optionally further modified.

Epoxidized vegetable or animal oils and the production thereof are well-known for a long time and some are commercially available. With respect to epoxidized oils and their production reference is for instance made to U.S. Pat. No. 2,569,502.

Suitable examples of epoxidized vegetable or animal oils are epoxidized soybean oil, epoxidized flax seed oil, epoxidized coconut oil, epoxidized chia oil, epoxidized rapeseed oil, epoxidized palm oil, epoxidized perilla oil, epoxidized cottonseed oil, epoxidized linseed oil including epoxidized high Ω linseed oil, epoxidized lard oil, epoxidized peanut oil, epoxidized olive oil, epoxidized sunflower oil, epoxidized safflower oil, epoxidized castor oil, epoxidized neat's foot oil, epoxidized corn oil, epoxidized cocao oil, epoxidized hazelnut oil, epoxidized grape-seed oil, epoxidized almond oil, epoxidized wheat germ oil, epoxidized menhaden oil, epoxidized whale oil, epoxidized herring oil, and epoxidized lallemantia oil. It is preferred that the oil contains a high content of unsaturated and polyunsaturated fatty acids as with such oils a high degree of epoxidation is possible.

According to one embodiment the oil to be used for epoxidation contains at least 20 wt.-% (poly)unsaturated fatty acids, more preferably at least 40 wt.-%, even more preferred at least 50 wt.-% and most preferred at least 70 wt.-%.

Preferred epoxidized oils of the foregoing are epoxidized linseed oil, epoxidized soybean oil, epoxidized safflower oil, epoxidized corn oil, and epoxidized lallemantia oil.

Also useful in the present invention are epoxidized vegetable or animal oils which are further modified. Suitable modifications are for instance prepolymerization, and copolymerization with other epoxy compounds, preferably prepolymerization.

The prepolymerization of oils and epoxidized oils is well-known and is for instance described in WO2004/063245.

Prepolymerized epoxidized oils can for instance be obtained by reacting the epoxidized oil with a polycarboxylic acid or anhydride thereof and thereby obtaining a polyester pre-polymer. Examples of suitable polycarboxylic acids are oxalic acid, maleic acid, succinic acid, chlorendic anhydride, phthalic anhydride, tetrahydrophthalic anhydride, hexahydrophthalic anhydride, nadic anhydride, adipic acid, citraconics, terephthalic acid, isophthalic acid, sebacic acid, azelaic acid, mellitic acid, pyromellitic acid, fumaric acid, itaconic acid, the alkyl or alkenyl substituted succinic acids, the dimerized fatty acids, diglycolic acid, and various tricarboxylic acids such as 1,2,3-propane tricarboxylic acid, citric acid, trimellitic acid and trimesic acid, especially preferred are oxalic acid and maleic acid.

Other prepolymerization methods are reaction of the oil with (meth)acrylic acid, aliphatic vinyl esters (like vinyl acetate) and alcohols.

As regards the epoxidation, the epoxidation degree is not particularly limited, and the oil can be fully epoxidized or only partially. The maximum degree of epoxidation is dependent on the content of (poly)unsaturated fatty acids in the oil. Preferably, the degree of epoxidation is 1 to 35% epoxide oxygen of the epoxidized oil, more preferably 5 to 25%, most preferably 8 to 20%. According to one embodiment the epoxide oxygen content is at least 9% based on the epoxidized oil.

The ink formulations of the present invention can contain one or more epoxidized optionally further modified vegetable or animal oils. If two or more are used they can differ in at least one of the following features: the kind of oil, the degree of epoxidation, the kind of modification, the degree of modification.

The amount of the epoxidized vegetable or animal oil(s) in the printing ink composition is 40 to 95 wt.-% based on the total ink composition, preferably 45 to 90 wt.-%, more preferably 50 to 80 wt.-%. If more than one epoxidized oil is used these ranges refer to the total amount of epoxidized optionally further modified vegetable/animal oils.

The other essential component of the inks according to the present invention is the reactive diluent which is selected from limonene diepoxide and oxetanes.

Oxetanes are cyclic ethers that very efficiently polymerize with high reaction speeds. Oxetanes have a high diluting power and can have a strong positive effect on other properties, such as adhesion, chemical resistance, gas barrier and others. Oxetanes useful in the present invention include monofunctional and multifunctional oxetanes, i.e. compounds with one or more oxetane groups. Examples are 3-ethyl-3-hydroxymethyloxetane (also known as trimethylolpropyl oxetane or TMPO), bis[(3-methyloxetan-3-yl)methyl]ether, bis[(1-ethyl-3-oxetanyl)methyl]ether (also abbreviated as DOX), 3-ethyl-3-[(2-ethylhexyloxy)methyl]oxetane, [1,4-bis(3-ethyl-3-oxetanylmethoxy)methyl]benzene, trans-3-tert-butyl-2-phenyloxetane, 3,3,4,4-tetramethyl-2,2-diphenyloxetane, di[3-ethyl(2-methoxy-3-oxetanyl)]methylether, 1,4-bis(2,3,4,4-tetramethyl-3-ethyloxetanyl)butane, 1,4-bis(3-methyl-3-ethyloxetanyl)butane, di(3,4,4-trimethyl-3-ethyl oxetanyl)butane, 3-(2-ethylhexyloxymethyl)-2,2,3,4-tetramethyloxetane, 2-(2-ethylhexyloxy)-2,3,3,4,4-pentamethyloxetane, 4,4'-bis[(2,4-dimethyl-3-ethyl-3-oxetanyl)methoxy]biphenyl, 1,7-bis(2,3,3,4,4-pentamethyloxetanyl-heptane)oxetanyl, 2-methoxy-3,3-dimethyloxetane, 2,2,3,3-tetramethyloxetane, 2-(4-methoxyphenyl)-3,3-dimethyloxetane, di(2-(4-methoxyphenyl)-3-methyloxetane-3-yl)ether.

In principle, the suitable oxetanes can be classified as oxetane compounds with one oxetane ring optionally having (a) substituent(s), and oxetane compounds with 2 or more oxetane rings each optionally having (a) substituent(s); the substituent(s) can for instance be present in 2-position or 3-position. Suitable substituents of the mono- and multifunctional oxetanes are for instance $C_1$-$C_8$ alkyl and $C_1$-$C_8$ alkoxy.

The most preferred oxetanes are TMPO and DOX. From an economical point of view TMPO is even more preferred.

Suitable oxetanes and references with respect to their preparation are for instance found in US2005/0119361 A1. Some oxetanes are also commercially available from Perstorp/SE and DKSH/Hamburg.

Limonene diepoxide (also known as dipentene dioxide) is another suitable reactive diluent. By the use thereof the content of sustainable materials in the printing ink is further increased.

The ink compositions of the present invention can contain one or more reactive diluents. If two or more reactive diluents are used they can be mixtures of different oxetanes or mixtures of oxetanes) and limonene diepoxide.

The amount of the reactive diluent(s) is not particularly limited. Preferably it is 5 to 25 wt.-% based on the total ink composition, more preferably 10 to 20 wt.-% and most preferably 8 to 15 wt.-%. If two or more reactive diluents are used these ranges refer to the total amount of them.

The inks according to the present invention optionally include a colorant which can be selected from all grades and types of organic and inorganic pigments and dyes which are suitable for use in screen printing ink applications.

Examples of the colorant include carbon blacks such as acetylene black, channel black and furnace black; metal powders such as an aluminum powder and bronze powder: inorganic pigments such as red oxides, yellow lead, ultramarine blue, chromium oxides and titanium oxides; and organic pigments such as azo pigments (including insoluble azo pigments, azolake pigments and condensed azo pigments), phthalocyanine pigments like metal-free phthalocyanine pigment and copper phthalocyanine pigment), anthraquinone dyes, quinacridon dyes, isoindolinone dyes, isoindoline dyes, dioxadin dyes, threne dyes, perylene dyes, perynone dyes, thioindigo dyes, quinophthalone dyes and metallic complexes; lakes of acid or basic dyes; oil-soluble dyes such as diazo dyes and anthraquinone dyes; and fluorescent pigments. Suitable pigments can be crude pigments as well as conditioned pigments.

The colorant exists in the ink usually in a dispersed state. The average particle diameter of the dispersed colorant in the ink is not particularly limited and can be a suitable size according to the purpose, while it is preferably in the range of 1 μm to 20 μm and more preferably 5 μm to 10 μm.

The added amount of the colorant is not particularly limited, and can be set at a suitable level in accordance with the purpose, while it is preferably in the range of 0.5 wt.-% to 15 wt.-% based on the total weight of the ink, more preferably 2 wt.-% to 10 wt.-%.

According to one embodiment the ink compositions according to the invention are intended for curing by EB. In such a case no cationic photoinitiator is necessary in the ink composition. According to another embodiment the ink compositions according to the invention are photocurable, and most preferably are UV-curable, and accordingly contain a suitable cationic photoinitiator (i.e. a photoinitiator which is capable of initiating a cationic cure mechanism).

For photocuring compositions such as UV-curing compositions, a wide range of commercially available cationic photoinitiators can be incorporated to initiate the cationic photocure mechanism. The amount of the cationic photoinitiator(s) is not particularly limited but is typically from 0.5 to 20 wt.-%, for example from 1 to 14 wt.-%, by weight of the total ink composition.

Suitable cationic photoinitiators include energy-activatable salts that can have a photochemically-reactive cationic portion and a non-nucleophilic anion. A broad class of cationic photoinitiators can be used, including those described in U.S. Pat. No. 4,250,311, U.S. Pat. No. 3,708,296, U.S. Pat. No. 4,069,055, U.S. Pat. No. 4,216,288, U.S. Pat. No. 5,084,586, U.S. Pat. No. 5,124,417, U.S. Pat. No. 4,985,340, and U.S. Pat. No. 5,089,536, the descriptions of which are incorporated herein by reference.

Suitable cations include organic onium cations, organometallic complex cations, and the like. Useful organic onium cations include, for example, sulfoxonium, iodonium like diaryliodonium, sulfonium like triarylsulfonium, carbonium, and phosphonium. Most preferred are I- and S-centered onium salts (for example, diaryliodonium and triarylsulfonium). The aryl group of such salts can be an unsubstituted or substituted aromatic moiety having up to about four independently selected substituents. The substituents preferably have fewer than about 30 carbon atoms and up to about 10 heteroatoms selected from N, S, non-peroxidic O, P, As, Si, Sn, B, Ge, Te, Se, and the like. Examples of such substituents include hydrocarbyl groups (such as methyl, ethyl, butyl, dodecyl, tetracosanyl, benzyl, allyl, benzylidene, ethenyl, and ethynyl); hydrocarbyloxy groups (such as methoxy, butoxy and phenoxy); hydrocarbylmercapto groups (such as methylmercapto and phenylmercapto); hydrocarbyloxycarbonyl groups (such as oxycarbonyl and phenoxycarbonyl); hydrocarbylcarbonyloxy groups (such as acetoxy and cyclohexanecarbonyloxy); hydrocarbylcarbonamide groups (such as acetamido and benzamido); azo; boryl; halo groups (such as chloro, bromo, iodo and fluoro); hydroxy; oxy; diphenylarsino; diphenylstibino; trimethylgermano; trimethylsilyxy; and aromatic groups (such as eyclopentadienyl, phenyl, tolyl, naphthyl, and indenyl). In sulfonium salts, it is possible for a substituent to be further substituted with a thioether or thioether-containing sulfonium cation (for example, diphenyl [4-(phenylthio)phenyl]sulfonium and (thiodiphenylene)bisdiphenylsulfonium).

Useful Organometallic complex cations include those described in U.S. Pat. No. 4,985,340, the description of which are incorporated herein by reference, and represented by the formula:

$$[(L^1)(L^2)M]^{+q} \qquad (I)$$

wherein M is a metal selected from the group consisting of Cr, Mo, W, Mn, Re, Fe, Ru, Os, Co, Rh, Ir, Pd, Pt, and Ni (preferably, selected from Cr, Mo, W, Mn, Fe, Ru, Co, Pd, and Ni; and, most preferably, from Mn and Fe); $L^1$ represents 1 or 2 cyclic, polyunsaturated ligands independently selected from the group consisting of substituted and unsubstituted cyclopentadienyl, cyclohexadienyl, cycloheptatrienyl, cyclooctatetraenyl, heterocyclic compounds, and aromatic compounds selected from substituted or unsubstituted arene compounds, and compounds having 2 to 4 fused rings, and units of polymer (for example, a phenyl group of polystyrene, poly(styrene-co-butadiene), poly(styrene-co-methyl methacrylate), poly(α-methylstyrene), and the like; a cyclopentadiene group of poly(vinylcyclopentadiene); a pyridine group of poly(vinylpyridine)) and the like, each capable of contributing 3 to 8 electrons to the valence shell of M; $L^2$ represents none, or 1 to 3 nonanionic ligands contributing an even number of electrons and independently selected from the group consisting of carbon monoxide, ketones, olefins, ethers, nitrosonium, phosphines, phosphites, and related derivatives of arsenic and antimony, organonitriles, amines, alkynes, isonitriles, dinitrogen, and the like, with the proviso that the total electronic charge contributed to M results in a net residual positive charge of q to the complex cation; and q is an integer of 1 or 2.

Useful anionic portions of the photoinitiators include those that can be represented by $X_n$, where X is an anion selected from the group consisting of tris-$R_f$ sulfonyl methide, bis-$R_f$ sulfonyl imide, tris-(fluorinated aryl)sulfonyl methide, tetrakis-(fluorinated aryl) borate and organic sulfonate anions, wherein each $R_f$ is independently selected from the group consisting of fluorinated or perfluorinated (preferably, perfluorinated) alkyl radicals having from 1 to about 20 carbon atoms, fluorinated aryl radicals having from 6 to about 10 carbon atoms, and ring structures formed from two said fluorinated or perfluorinated alkyl radicals joined together to form a unitary alkylene radical having 5 or 6 ring atoms, said radicals optionally containing one or more divalent oxygen, trivalent nitrogen, or divalent sulfur atoms; and n is an integer of 1 or 2 (the number of complex anions required to neutralize the charge "q" on the complex cation).

Examples of such anions are described in U.S. Pat. No. 5,554,664, the description of which is incorporated herein by reference. Useful anions also include those described in U.S. Pat. No. 6,265,459, the description of which is incorporated herein by reference.

In addition to those described above, suitable anions, X, for use as the counterion to the above-described cations include those represented by the formula

$$DQ_r \qquad (II)$$

wherein D is a metal from Groups IB to VIIB and VIII or a metal or metalloid from Groups IIIA to VA of the Periodic Table of Elements (CAS notation); Q is a halogen atom, a hydroxyl group, a substituted or unsubstituted phenyl group, or a substituted or unsubstituted alkyl group; and r is an integer of 1 to 6. Preferably. D is selected from metals such as copper, zinc, titanium, vanadium, chromium, aluminum, tin, gallium, zirconium, indium, manganese, iron, cobalt, and nickel, or from metalloids such as boron, antimony, arsenic, and phosphorus. Preferably. Q is a halogen atom (more preferably, chlorine or fluorine). Representative examples of such anions include $B(phenyl)_4^-$, $B(phenyl)_3(alkyl)^-$ (where alkyl can be ethyl, propyl, butyl, hexyl, and the like), $BF_4^-$, $PF_6^-$, $AsF_6^-$, $SbF_6^-$, $FeCl_4$, $SnCl_5^-$, $SbF_5OH^-$, $AlCl_4^-$, $AlF_6^-$, $GaCl_4^-$, $InF_4^-$, $TiF_6^-$, $ZrF_6^-$, $B(C_6F_5)_4^-$, and $B(C_6F_3(CF_3)_2)_4^-$. Preferred anions include $BF_4^-$, $PF_6^-$, $AsF_6^-$, $SbF_6^-$, $SbF_5OH^-$, $B(C_6F_5)_4^-$, $B(C_6F_3(CF_3)_2)_4^-$, and $B(phenyl)_4^-$.

Other anions, X, useful in suitable photoinitiators include $CH_3SO_3^-$, $CF_3SO_3^-$, $C_6H_5SO_3^-$, p-toluenesulfonate, p-chlorobenzenesulfonate, and the like. Preferred anions include $BF_4^-$, $PF_6^-$, $SbF_6^-$, $SbF_5OH^-$, $AsF_6^-$, $SbCl_6^-$, $CF_3SO_3$, $C(SO_2CF_3)_3^-$, and $N(SO_2CF_3)_2^-$.

Preferred cationic photoinitiators are triarylsulfonium salts like triarylsulfonium hexafluorophosphates and iodonium salts like iodonium hexafluorophosphates.

Suitable cationic photoinitiators are commercially available or can be prepared by known methods.

The compositions of the present invention can optionally also contain one or more free radical photoinitiators which may be suitable as curing accelerators. If they are used their total amount is preferably 0.1 to 5 wt.-% based on the total ink composition, more preferably 0.5 to 2.5 wt.-%.

Suitable free radical photoinitiators include, for example 2,4,6-trimethylbenzyl diphenyl phosphine oxide (Lucerin™ TPO, BASF), bis(2,4,6-trimethylbenzoyl)phenyl phosphine oxide (Irgacure 819, Ciba Geigy), bis(2,6-dimethoxybenzoyl)-2,4,4-trimethylpentyl phosphine oxide, ethyl-2,4,6-trimethylbenzoylphenyl-phosphinate (Lucerin™ TPO-L, BASF), 2-benzyl-2-dimethylamino-1-(4-morpholinphenyl) butan-1-one (Irgacure™ 369, Ciba Geigy), 1-hydroxycyclohexyl acetophenone (Irgacure™ 184, Ciba Geigy), iso-propyl thioxanthone (Quantacure™ ITX, IBIS or Speedcure™ ITX, Lambson); 2-chloro thioxanthone (Kayacure™ CTX, Nippon Kayaku), oligo[2-hydroxy-2-methyl-1-[4-(1-methylvinyl)phenyl]propanone] and 2-hydroxy-2-methyl-1-phenyl-1-propanone (Esacure™ KIP100F, Lamberti), methyl benzoyl formate (Genocure MBF Rahn), benzophenone, 2-methyl-1-[4-(methylthio)phenyl]-2-morpholinopropan-1-one (Irgacure™ 907, Ciba Geigy), 2-isopropylthioxanthone, anthracene and derivatives thereof.

A person skilled in the art can find the optimum cure accelerator for a certain ink formulation by suitable experiments. According to one embodiment iodonium salts may be used as cationic photoinitiator in combination with a hydroxyketon as curing accelerator (radical photoinitiator).

Further Optional Additives:

If desired, adhesion promotes like inert or passive resins such as acrylics, styrene acrylates, polyesters, polycarbonates or celluloses may be included in the ink in small amounts in order to improve the adhesion of the ink coating. If included, for example an amount not exceeding 15%, and preferably not exceeding 10%, by weight of the composition is used.

The inks of the present invention can optionally contain one or more (meth)acrylic monomers usually used in screen printing inks. In view of the object of using a high amount of sustainable material it is, however, preferred that the amount of (meth)acrylic monomers is less than 5 wt.-% based on the total ink composition and it is preferred that no acrylic monomers are present.

Additives such as wetting agents, silicone and non-silicone antifoams may be incorporated to improved print properties such as substrate wetting and flow-out, and may be included in an amount of preferably from 0 to 5%, more preferably from 0 to 2%, by weight of the ink composition.

Fillers may be included to control the viscosity and rheology of the ink composition typically to improve printing characteristics, and may be present preferably in an amount of from 0 to 40%, more preferably from 0 to 30%, by weight of the ink composition, most preferably 0 to 10 wt.-%.

Suitable fillers include, but are not limited to, china clay, talc, barium sulphate, aluminium silicate, and silica.

It will be appreciated that the compositions according to the invention will be substantially free of organic solvents like petroleum-based solvents. However, small amounts of organic solvent may be included, if needed, in amounts not exceeding 10%, and preferably not exceeding 5%, by weight of the composition. Most preferred is that the composition is free of organic solvent. According to another embodiment, the composition is substantially free of water (i.e. contains not more than 5 wt.-% water, preferably not more than 1 wt.-%). Further suitable optional additives are anti-skinning agents; levelling agents; cure accelerators; fire-retardants; rheological modifiers; etc.

If the ink composition is intended for single colour screen printing epoxidized vegetable or animal oils and modified epoxidized vegetable and animal oils are suitable.

For multi-colour screen printing epoxidized oils and further modified epoxidized oils can be used, however, it is preferred to use prepolymerized epoxidized oils as they need less energy for sufficiently curing the ink before the next ink is applied.

Usual energy values are between 30 and 600 ma/cm$^2$, preferably 50 to 400 mJ/cm$^2$ and more preferably 80 to 200 mJ/cm$^2$. Conventional UV curing units containing Hg lamps can be used for curing the inks of the present invention.

The ink compositions of the present invention are intended for use in screen printing. Accordingly, their viscosity is relatively high (often pasty) compared to inks for other printing methods such as graver printing or ink jet printing. Preferably, the viscosity of inks according to the present invention is 1 to 20 Pa·s at a shear rate of 3 s$^{-1}$ when measured with a rotational viscometer of the plate-cone type (cone geometry: 2°/40 mm) at 20° C. (as is for instance available from Bohlin Instruments); when measured at a shear rate of 150 s$^{-1}$ at 20° C. with the plate-cone rotational viscometer (cone geometry: 2°/40 mm) the viscosity is preferably 0.5 to 15 Pa·s, More preferably the viscosity is 4 to 15 Pa·s at 3 s$^{-1}$; at 150 s$^{-1}$ the viscosity is more preferably and 1 to 12 Pa·s.

Characteristic for screen printing inks in general and therefore also for the inks of the present invention is that the viscosity decreases with increasing shear rate.

The viscosity of the inks according to the present invention can be adjusted to the specific screen printing method. Usually the viscosity of a line colour is from 3 to 10 Pa·s at 3 s$^{-1}$ and 1 to 8 Pa·s at 150 s$^{-1}$ when measured as described above, while the viscosity of a process colour is usually from 8 to 15 Pa·s at 3 s$^{-1}$ and 5 to 10 Pa·s at 150 s$^{-1}$ when measured as described above.

Epoxidized oils suitable for the present invention depending on the kind of oil and the degree of epoxidation may have a viscosity of about 0.8 to 2 Pa·s when measured at 20° C. with a shear rate of 6.42 s$^{-1}$ with a viscometer as described above; by prepolymerizing the epoxidized oils their viscosity increases depending on the degree of prepolymerization to about 4 to 15 Pa·s at 20° C. and a shear rate of 6.42 s$^{-1}$.

It is the intention of the present inventors that each feature (like compounds, amounts etc.) and embodiment described above can be combined with any other feature or embodiment described although not each and every combination is explicitly mentioned above.

EXAMPLES

The following inks were prepared according to conventional methods for preparing screen inks.

Example 1

Blue Screen Printing Ink

| | |
|---|---|
| Epoxidized vegetable oil[1] | 71.50 |
| C.I. pigment blue 15:3, pigment paste (25%) | 6.00 |
| TMPO[2] | 15.00 |
| Uvacure UVI-6992[3] | 5.00 |
| Silica[4] | 1.50 |
| Defoamer/Levelling Agent[5] | 1.00 |
| Total | 100.00 wt-% |

Example 2

Blue Screen Printing Ink

| | |
|---|---|
| Epoxidized vegetable oil[1] | 77.50 |
| C.I. pigment blue 15:3, pigment paste (25%) | 2.00 |
| TMPO[2] | 12.00 |
| Uvacure UVI-6992[3] | 4.00 |
| Silica[4] | 3.00 |
| Defoamer/Levelling Agent[5] | 1.00 |
| ITX[6] | 0.50 |
| Total | 100.00 wt-% |

Example 3

Blue Screen Printing Ink with Filler/Extender

| | |
|---|---|
| Epoxidized vegetable oil[1] | 51.70 |
| C.I. pigment blue 15:3, pigment paste (25%) | 1.00 |
| TMPO[2] | 8.50 |
| Uvacure UVI-6992[3] | 3.00 |
| Silica[4] | 0.70 |
| Defoamer/Levelling Agent[5] | 0.70 |

-continued

| ITX[6] | 0.40 |
|---|---|
| Silicate | 34.00 |
| Total | 100.00 wt-% |

[1] Dracowol EP10/1 available from Dracosa AG, Wolfen (epoxidized *lallemantia* oil)
[2] trimethylolpropyl oxetane, available from Perstorp
[3] cationic photoinitiator, available from Union Carbide
[4] filler, HDK-N20, available from Wacker AG
[5] Coatosil 100 E, available from Wittco
[6] free radical UV photoinitiator (2-isopropyl-thioxanthone)

Example 4

Blue Screen Printing Ink

Example 1 was repeated, however, Dracowol EP 10/1 was replaced by epoxidized lallemantia oil which had been pre-polymerized by using oxalic acid (viscosity: 6.6 Pa·s when measured at 20° C. with a shear rate of 6.42 s$^{-1}$ with a rotational viscometer as described above; compared to 1.1 Pa·s for Dracowol EP 10/1).

Example 5

Blue Screen Printing Ink

Example 1 was repeated, however, Dracowol EP 10/1 was replaced by epoxidized linseed oil.

Example 6

Blue Screen Printing Ink

Example 1 was repeated, however, TMPO was replaced by DOX.

Example 7

Blue Screen Printing Ink

Example 1 was repeated, however, TMPO was replaced by limonene diepoxide.

Example 8

Printing Tests

The screen printing inks of the examples above were tested with a printing press (Theme Model 5020) useful for 5-colour-printing. As substrates soft PVC adhesive films, hard PVC plates, polypropylene plates, paper and board were used.

For drying/curing 2 UV lamps were used. The first lamp was adjusted to 80 W/cm, while the second one was adjusted to about 50 W/cm. The scan dryer speed was 50 m/min resulting in an energy dose of about 150 mJ/cm$^2$.

The obtained printing speeds are within the presently acceptable ranges although the inks avoided acrylates and instead thereof contained a high content of sustainable materials. The inks of the present invention are, therefore, suitable for commercial/industrial screen printing.

The invention claimed is:

1. A printing ink composition, comprising
   (a) at least one epoxidized vegetable or epoxidized animal oil which is optionally further modified, and
   (b) at least one reactive diluent selected from among limonene diepoxide and optionally substituted oxetanes, wherein:
   the amount of component (a) is 40 to 95 wt % based on the total ink composition; and the printing ink has a viscosity of 1 to 20 Pa·s at a shear rate of 3 s$^{-1}$ when measured at 20° C. with a rotational viscometer of the plate-cone type having a cone geometry of 2°/40 mm.

2. The printing ink composition according to claim 1, further comprising a colorant.

3. The printing ink composition according to claim 1, further comprising a cationic photoinitiator.

4. The printing ink composition according to claim 1, wherein the reactive diluent is selected from among trimethylolpropyl oxetane, bis[(3-methyloxetan-3-y])-methyl]ether, bis[1-ethyl(3-oxetanyl)methyl]ether, 3-ethyl-3-[(2-ethylhexyloxy)methyl]-oxetane, [1,4-bis(3-ethyl-3-oxetanylmethoxy)methyl]benzene, trans-3-tert-butyl-2-phenyloxetane, 3,3,4,4-tetramethyl-2,2-diphenyloxetane, di[3-ethyl(2-methoxy-3-oxetanyl)]methylether, 1,4-bis(2,3,4,4-tetramethyl-3-ethyloxetanyl)-butane, 1,4-bis(3-methyl-3-ethyloxetanyl)butane, di(3,4,4-trimethyl-3-ethyloxetanyl)-butane, 3-(2-ethylhexyloxymethyl)-2,2,3,4-tetramethyloxetane, 2-(2-ethylhexyloxy)-2,3,3,4, 4-pentamethyloxetane, 4,4'-bis[(2,4-dimethyl-3-ethyl-3-oxetanyl)methoxy]-biphenyl, 1,7-bis(2,3,3,4,4-pentamethyloxetanylheptane)oxetanyl, 2-methoxy-3,3-dimethyloxetane, 2,2,3,3-tetramethyloxetane, 2-(4-methoxyphenyl)-3,3-dimethyloxetane, di(2-(4-methoxyphenyl)-3-methyloxctane-3-yl)ether.

5. The printing ink composition according to claim 1, wherein the epoxidized vegetable or animal oil is selected from among epoxidized soybean oil, epoxidized flax seed oil, epoxidized coconut oil, epoxidized chia oil, epoxidized rapeseed oil, epoxidized palm oil, epoxidized perilla oil, epoxidized cottonseed oil, epoxidized linseed oil, epoxidized lard oil, epoxidized peanut oil, epoxidized olive oil, epoxidized sunflower oil, epoxidized safflower oil, epoxidized castor oil, epoxidized neat's foot oil, epoxidized corn oil epoxidized menhaden oil, epoxidized whale oil, epoxidized herring oil, and epoxidized lallemantia oil, and prepolymerized derivatives of the foregoing.

6. The printing ink composition according to claim 1, wherein the epoxidation degree is 5 to 25 wt.-% epoxide oxygen of the epoxidized oil.

7. The printing ink composition according to claim 1, wherein the amount of component (b) is 5 to 25 wt.-% based on the total ink composition.

8. The printing ink composition according to claim 1, wherein the amount of component (a) is 45 to 90 wt.-% based on the total ink composition.

9. The printing ink composition according claim 1, which is substantially free of (meth)acrylic monomers.

10. The printing ink composition according claim 1, which is substantially free of petroleum-based solvents.

11. The printing ink composition according to claim 1, further comprising one or more members selected from fillers, defoamers, levelling agents, cure accelerators, adhesion promoters and rheological modifiers.

12. A method for screen printing, comprising: applying an ink composition of claim 1 to a substrate via a screen printing process; and
   curing the ink composition.

13. The method according to claim 12, wherein the curing is achieved with UV radiation.

14. The method according to claim 12, wherein the curing is achieved with electron beam radiation.

* * * * *